United States Patent [19]

Barton

[11] Patent Number: 4,749,415

[45] Date of Patent: Jun. 7, 1988

[54] FAST RESPONSE THERMOCOUPLE ELEMENT

[75] Inventor: Serge P. Barton, Oviedo, Fla.

[73] Assignee: Westinghouse Electric Corp., Pittsburgh, Pa.

[21] Appl. No.: 8,028

[22] Filed: Jan. 28, 1987

[51] Int. Cl.[4] .............................................. H01L 35/02
[52] U.S. Cl. ..................................... 136/230; 136/228; 374/179
[58] Field of Search ............... 136/219, 228, 230, 231, 136/232, 234, 242; 374/179; 29/573; 339/176 T

[56] References Cited

U.S. PATENT DOCUMENTS

| | | | |
|---|---|---|---|
| 1,651,750 | 12/1927 | Brophy | 136/228 |
| 2,316,872 | 4/1943 | Kernen | 136/228 X |
| 2,466,175 | 4/1949 | Kretsch et al. | 136/228 |
| 2,698,352 | 12/1954 | Flagg et al. | 136/228 |
| 3,077,505 | 2/1963 | Eshaya | 136/228 |
| 3,913,058 | 10/1975 | Nishio et al. | 136/230 X |
| 4,021,268 | 5/1977 | Smith | 136/228 |
| 4,155,776 | 5/1979 | Romer | 136/230 X |
| 4,460,802 | 7/1984 | Benedict et al. | 136/230 |

FOREIGN PATENT DOCUMENTS

| | | | |
|---|---|---|---|
| 12708 | 4/1914 | United Kingdom | 136/228 |
| 193119 | 2/1967 | U.S.S.R. | 136/242 |

Primary Examiner—Deborah L. Kyle
Assistant Examiner—Brian Steinberger

[57] ABSTRACT

A thermocouple element (10) for use in high-pressure, high temperature fluid applications having a cylindrical body portion (12) formed from a first metal and a cap (14) formed from a dissimilar metal. The cap is fused to the body such that the junction (18) forms an axial thermocouple junction. A plurality of grooves (13, 20) is formed in the cap and body to reduce the mass of material adjacent the junction for rapid conduction heat transfer from the fluid being monitored.

14 Claims, 2 Drawing Sheets

FAST RESPONSE THERMOCOUPLE ELEMENT

TECHNICAL FIELD

The present invention relates generally to thermocouple elements, and more particularly to a thermocouple element for use in high-pressure systems which require a rapid response to changes in temperature in a working fluid.

BACKGROUND ART

In systems such as steam turbines and the like, it is necessary to measure temperature at conditions of high pressure and temperature for monitoring and controlling of such systems. When the temperature information from a temperature sensor is utilized to measure or control a process or operation of a system or equipment, it is essential in many cases that the temperature sensitive device have a fast response, for example to prevent overshoot and instability. When a thermcouple is used as a temperature sensor, it is common to isolate the juntion from the working fluid by means of a thermocouple well. Changes in temperature must communicate to the thermocouple junction through the walls of the thermocouple well and a delay in response occurs. Thus, such construction is not generally satisfactory when fast response is required.

There have been attempts in the prior art to improve the response of thermocouples; for example, see U.S. Pat. No. 4,460,802 to Benedict et al. This patent discloses several variations in design but basically teaches a flat disc of one metal radially welded to a tubular element of dissimilar metal so as to form a well-likd structure. The leads are attached to the disc element and the tubular element with the radial junction therebetween producing the desired electromotive fore when the temperature at the junction differs from that of the external reference junction of the thermocouple system. An improved speed of response is claimed over the conventional well housing a small junction since the dissimilar metals and the junction are exposed directly to the fluid being monitored.

While an improvement in response may be obtained from the Benedict et al thermocouple, it has certain disadvantages when used in systems in which the fluids are under high pressure. Pressure on the disc element will create stresses in the radial junction which may result in cracking or separation. As will be understood, such pressure will tend to cause the disc element to dish and therefore will tend to separate the junction at the periphery of the disc. Thus, the radial arrangement may not be entirely suitable for use in high pressure systems.

Therefore, there is a need for a thermocouple element for use in high-pressure, high-temperature applications hving a very fast response yet which will be free from radial and other excessive stresses at the junctions of the dissimilar metals.

DISCLOSURE OF THE INVENTION

The present invention is an improved thermocouple element for use in high-pressure, high-temperature applications having a cylindrical body portion formed from a first metal. The distal end of the cylindrical body is reduced in diameter to form a cylindrical shoulder between the end thereof and the body. Preferably, a plurality of lands is provided in the body portion adjacent the shoulder to enhance heat transfer. A cap having the same outside diameter as that of the boyd is formed to fit over the reduced diameter distal end. The cap is formed from the desired dissimilar metal such that the inner circumference of the cap forms an axial thermocouple junction with the outer circumference of the distal end portion of the body. By use of an electron beam or similar focused fusing process, the junction of the two metals are welded together.

A lead is attached to the cap via an insulated sleeve through the body, which lead in combination with a connection to the body provides the output connections to the thermocouple.

A plurality of lands is also formed in the outer periphery of the cap. In combination with the lands and grooves formed in the body portion, permit heat from the fluid to quickly flow to the axial ring type junction of the thermocouple. The thicknesses and geometry of the cap end and ring portion are selected to minimize the time required for the junction to attain a different temperature when the temperature of the fluid changes.

When the cap is subjected to high pressures, the skirt or ring portion of the cap will effectively resist the dishing effect on the end surface of the cap and minimize the stresses which may occur in the welded junction. This construction minimizes stresses and permits thinner materials to be used thereby providing a rapid thermoelectric response.

It is therefore a principal object of the invention to provide an improved thermocouple temperature sensing element suitable for high-pressure, high-temperature applications having a cylindrical junction and providing a fast thermoelectric response.

It is another object of the invention to provide a cylindrical axial thermocouple junction having a cap formed from one metal element of the thermocouple and a body formed from the other dissimilar metal element.

It is yet another object of the invention to provide a fast response thermocouple element having low mechanical stresses in the junction when used in high pressure systems.

It is still another object of the invention to provide a cylindrical thermocouple temperature sensor having low stresses and relatively thin materials with surface grooves and lands in the vicinity of the junction to thereby improve the thermoelectric response.

These and other objects and advantages of the invention will become apparaent from the following detailed description when read in conjunction with the drawings.

BEST MODE FOR CARRYING OUT THE INVENTION

Figure 1:
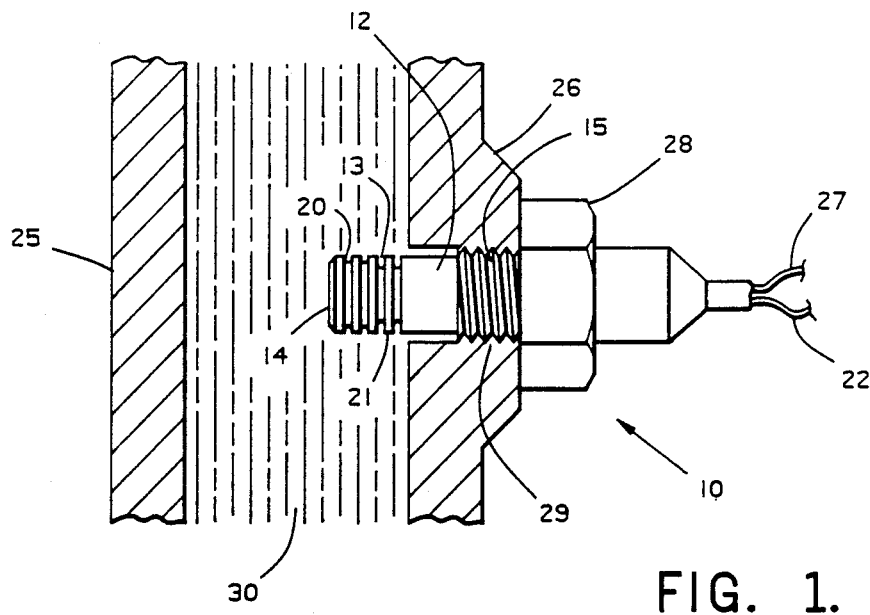
FIG. 1 is a cross-sectional view of a conduit having the thermocouple element of the invention installed therein.

A typical application for which the invention is eminently suited is measurements of temperature of steam in a conduit of a high pressure steam turbine. Referring first to FIG. 1, a conduit 25 is illustrated having a fluid 30 flowing therethrough.

It is desired to accurately measure the temperature of the fluid 30 and more particularly to be able to monitor changes in such temperature very rapidly. To that end, the thermocouple element of the invention shown generally at 10 is provided. Although thermocouple element 10 may be constructed in various forms, FIG. 1 shows a typical design. A generally cylindrical body portion 12 is formed from a first metal and includes a proximal end 19 having a threaded portion 15 a hexagonal nut portion 28. In the example, a boss 26 is provided in conduit 25 having threads 29 to accept the threads of portion 15. Adjacent the distal end 17 of body 12, on the outer surface thereof a set of grooves 13 is provided. A cap 14 is installed over the distal end 17 of body 12 as will be shown in more detail hereinafter.

Cap 14 is formed from a dissimilar metal from that of body 12 such that a thermocouple junction 18 (not seen in FIG. 1) is formed between cap 14 and the distal end 17 of body 12. Leads 22 and 27 are connected to the cap 14 and boyd 12 respectively and represent the output leads from the thermocouple junction 18. Cap 14 includes a pair of grooves 20.

As will be understood, grooves 13 and 20 increase the surface area exposed to fluid 30 and at least one groove serves to minimize thickness over the junction in order to increase the flow of heat to the junctio 18.

Figure 2:
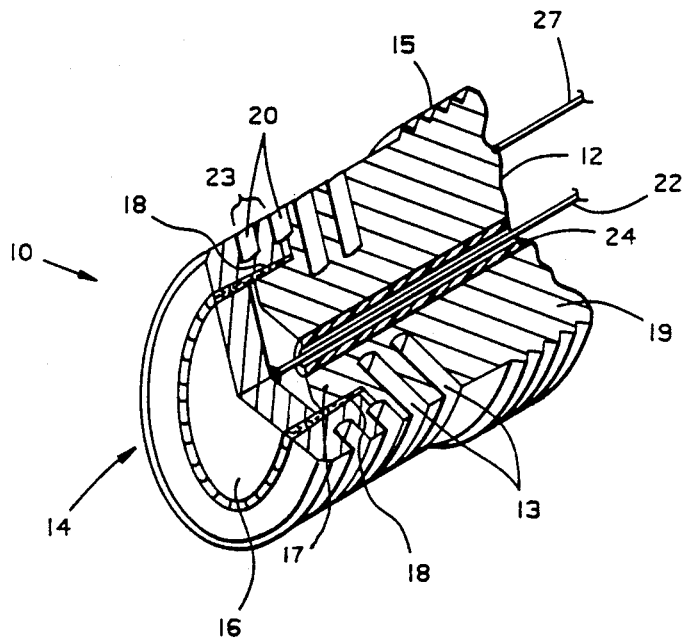
FIG. 2 is a cutaway partial view of the thermocouple element of FIG. 1.

In FIG. 2, a partial perspective view of the thermocouple element 10 is shown, partially cut away to show details of the junction 18. Body portion 12 may be seen to have a threaded proximal end 19 and a reduced diameter distal end 17. In addition, as mentioned above, a pair of grooves 13 is provided adjacent distal end 17.

A cap, shown generally at 14, is formed from the desired dissimilar metal and has a disc end 16 and a contiguous generally cylindrical ring-shaped skirt portion 23. Skirt portion 23 includes a pair of concentric grooves 20 turned therein on the outer surface thereof. Cap 14 is disposed over distal end 17 of body 12 and a portion of the inner circumference of skirt 23 is welded to the external circumferential surface of distal portion 17 of body 12 to form the junction 18.

The welding may be accomplished by electron beam techniques or other suitable welding methods known in the prior art. A lead 22 formed of the same metal as cap 14 is attached to the center of cap 14 and extends through the center which may contain an insulating sleeve 24 which may be a suitable ceramic or other high temperature insulating material. As can be seen viewing FIG. 2, body portion 12 basically comprises a cylindrical wall which surrounds an opening for receiving thermacouple lead 22.

The thermocouple element 10 may be formed from any pair of dissimilar metals dependent upon the temperatures to be measured and the application for which the device is to be used. Typically, body 12 may be of stainless steel while end cap 14 may be formed from nickel. Other well known combinations of metals are iron-constantan, chromel-alumel, and copper-constantan. To ensure a rapid response, it is desirable that the disc end 16 of cap 17 be relatively thin and by way of example, may be on the order of 5 mm. The diameter of the body portion 12 and cap portion 14 may be on the order of 2-5 cm.

Figure 3:
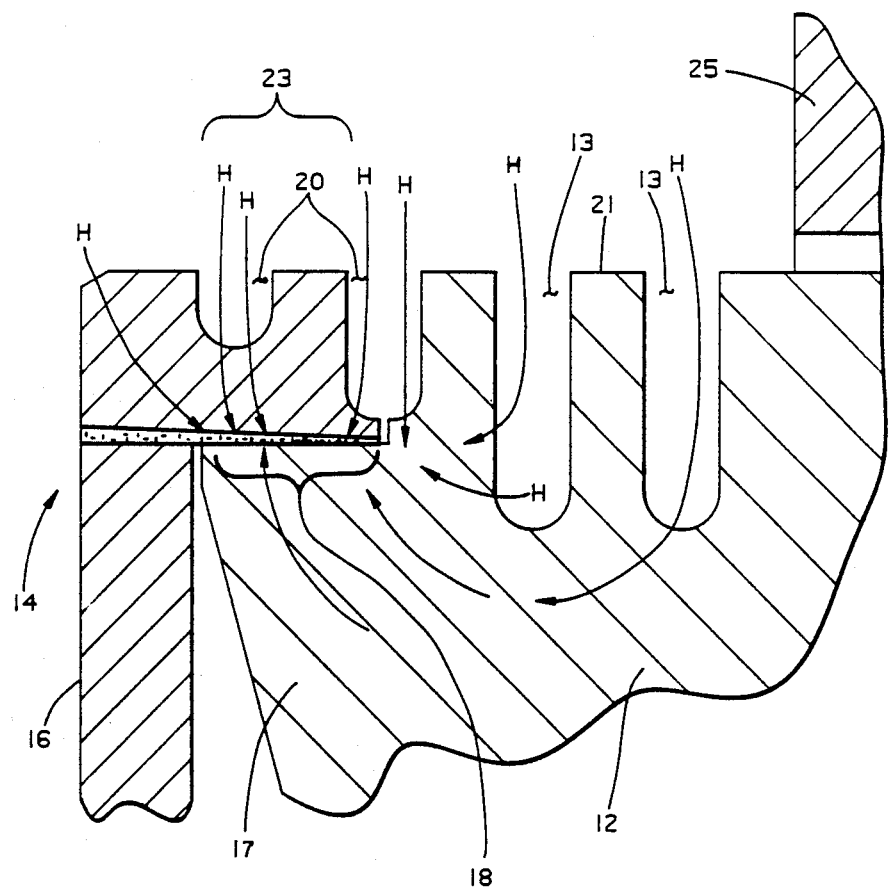
FIG. 3 is a partial cross-sectional view of the thermocouple element of FIG. 1 showing the thermocouple junction and the manner of heat flow thereto.

Turning now to FIG. 3, additional details of the junction may be more clearly seen. A partial cross-sectional view of the thermocouple element 10 of FIG. 1 is shown and junction 18, formed by welding the inner circumferential surface of skirt 23 to the distal end 17 of body 12, is illustrated. Assuming that the thermocouple element 10 of FIG. 3 is exposed to a source of heat, the arrows H show the relatively short paths through the cap and body materials required through which heat flows to bring the junction 18 to equilibrium with the fluid temperature. It may also be noted from FIG. 3 that pressure on the external face of disc portion 16 of cap 14 will produce only minimal stresses appearing at the edge of cap 14 such that the integrity of junction 18 is not affected. As will now be recognized, the grooves in cap 14 and body 12 reduce the mass of the material adjacent the junction and provide more surface for conductive heat transfer which surface is exposed directly to the gas or fluid being monitored.

As will now be apparent, a new and improved thermocouple element has been disclosed which can be constructed to be extremely rugged, with high reliability and fast response. By virtue of the cap arrangement of the thermocouple, the environment being measured is isolated from the interior of the body of the device and a thermocouple junction along a cylindrical surface is produced. This construction advantageously minimizes stresses common in radial type junctions which occur when the cap is subjected to high pressures. The cap and corner are formed from a homogeneous material; thus, predominately compressive stresses will develop in the junction and the probability of failure is greatly reduced over known prior art elements.

Although a specific embodiment of the invention has been disclosed, various modifications may be made in the design of the unit without departing from the spirit and scope of the invention. For example, the principles of the invention can be embodied in thermocouple elements having a junction which is not a right circular cylinder as long as radial junctions are avoided. Other variations in the implementation of the invention will be apparent to those of skill in the art.

I claim:

1. A stress resistive, heat sensitive thermocouple device for detecting temperature changes in a working fluid, said device comprising:
    an elongated body portion formed from a first metal and comprising a cylindrical wall surrounding a thermocouple lead receiving opening;
    a cap formed from a second metal, said first and second metals being dissimilar metals, said cap having a cylindrical skirt disposed over one end of the body portion;
    a thermocouple junction formed between an inner surface of the skirt and an outer surface of the body portion;
    heat transfer increasing means on the outer surface of the cylindrical wall adjacent said junction; and
    heat transfer increasing means on the outer surface of the cyindrical skirt adjacent said junction,
    said means on the cylindrical wall and said means on the cylindrical skirt each being arranged and adapted for directly contacting the working fluid.

2. A device as set forth in claim 1 wherein the means on the cylindrical skirt is configured to minimize the thickness of the skirt adjacent said junction.

3. A device as set forth in claim 1 wherein the means on the cylindrical skirt is configured to increase the exposed heat transfer surface of the skirt adjacent said junction.

4. A device as set forth in claim 1 wherein said means on the skirt is configured to minimize the thickness of the skirt and increase the exposed heat transfer surface of the skirt adjacent said junction.

5. A device as set forth in claim 1 wherein said means on the skirt comprises groove means disposed adjacent said one end of the body portion.

6. A device as set forth in claim 1 wherein said means on the cylindrical wall is configured to minimize the thickness of the cylindrical wall adjacent said junction.

7. A device as set forth in claim 6 wherein the means on the cylindrical skirt is configured to minimize the thickness of the skirt adjacent said junction.

8. A device as set forth in claim 1 wherein said means on the cylindrical wall is configured to increase the exposed heat transfer surface of the cylindrical wall adjacent said junction.

9. A device as set forth in claim 8 wherein the means on the cylindrical skirt is configured to increase the exposed heat transfer surface of the skirt adjacent said junction.

10. A device as set forth in claim 1 wherein said means on the cylindrical wall is configured to minimize the thickness of the wall and increase the exposed heat transfer surface of the wall adjacent said junction.

11. A device as set forth in claim 10 wherein said means on the skirt is configured to minimize the thickness of the skirt and increase the exposed heat transfer surface of the skirt adjacent said junction.

12. A device as set forth in claim 11 wherein said means on the cylindrical wall comprises groove means disposed adjacent said one end of the body portion.

13. A device as set forth in claim 12 wherein said means on the skirt comprises groove means disposed adjacent said one end of the body portion.

14. A device as set forth in claim 13 wherein said groove means on the wall and said groove means on the skirt are disposed in side-by-side relationship.

* * * * *